United States Patent
Paddon et al.

(10) Patent No.: US 10,069,627 B2
(45) Date of Patent: Sep. 4, 2018

(54) DEVICES AND METHODS FOR FACILITATING GENERATION OF CRYPTOGRAPHIC KEYS FROM A BIOMETRIC

(71) Applicant: QUALCOMM Incorporated, San Diego, CA (US)

(72) Inventors: Michael William Paddon, Tokyo (JP); Miriam Wiggers De Vries, Lane Cove (AU); Philip Michael Hawkes, Warrimoo (AU); Craig Brown, Freshwater (AU); Guilherme Luiz Karnas Hoefel, La Jolla, CA (US); Craig William Northway, Aspley (AU)

(73) Assignee: QUALCOMM Incorporated, San Diego, CA (US)

( * ) Notice: Subject to any disclaimer, the term of this patent is extended or adjusted under 35 U.S.C. 154(b) by 172 days.

(21) Appl. No.: 14/790,849

(22) Filed: Jul. 2, 2015

(65) Prior Publication Data

US 2017/0005794 A1  Jan. 5, 2017

(51) Int. Cl.
*H04L 9/08* (2006.01)
*H04L 9/32* (2006.01)
*G06F 21/31* (2013.01)

(52) U.S. Cl.
CPC .......... *H04L 9/0866* (2013.01); *H04L 9/3231* (2013.01); *G06F 21/31* (2013.01)

(58) Field of Classification Search
CPC . H04L 9/08; H04L 9/30; H04L 9/3234; H04L 9/3231; G06F 21/31–21/32
See application file for complete search history.

(56) References Cited

U.S. PATENT DOCUMENTS

| 8,811,610 B2 | 8/2014 | Ahn et al. |
| 8,965,066 B1 | 2/2015 | Derakhshani et al. |
| 2004/0148509 A1 | 7/2004 | Wu |
| 2006/0123241 A1* | 6/2006 | Martinian ............ H04L 9/3231 713/186 |
| 2007/0118885 A1 | 5/2007 | Elrod |
| 2008/0141104 A1* | 6/2008 | Miyazaki .......... H03M 13/2903 714/801 |

(Continued)

FOREIGN PATENT DOCUMENTS

WO  WO-2009095289 A1  8/2009

OTHER PUBLICATIONS

International Search Report and Written Opinion—PCT/US2016/035523—ISA/EPO—dated Jan. 31, 2017.

*Primary Examiner* — Hadi S Armouche
*Assistant Examiner* — Shaqueal D Wade
(74) *Attorney, Agent, or Firm* — Loza & Loza, LLP/Qualcomm

(57) ABSTRACT

Electronic devices are adapted to generate cryptographic keys from one or more biometrics. According to one examples, an electronic device can obtain a non-encoded bit string associated with biometric information for an individual. The non-encoded bit string can be treated as if it were encoded and a decoding operation may be applied to the bit string, resulting in a modified bit string. One or more cryptographic keys can then be generated based at least in part on the modified bit string. Other aspects, embodiments, and features are also included.

26 Claims, 5 Drawing Sheets

(56) References Cited

U.S. PATENT DOCUMENTS

2009/0110192 A1* 4/2009 Elrod .................... H04L 9/0866
　　　　　　　　　　　　　　　　　　　　　　　　　380/44
2012/0014520 A1　　1/2012　Baughman
2013/0044876 A1　　2/2013　Shaw et al.

* cited by examiner

DEVICES AND METHODS FOR FACILITATING GENERATION OF CRYPTOGRAPHIC KEYS FROM A BIOMETRIC

TECHNICAL FIELD

The technology discussed below relates generally to cryptography, and more specifically to methods and devices for generating cryptographic keys from one or more biometrics.

BACKGROUND

Cryptography generally relates to techniques for securing communication and information in the presence of third parties. One form of cryptography includes encryption, which is the process of encoding messages and information in such a way that only authorized parties can read it. Encryption does not of itself prevent interception of communications or information, but denies an interceptor the ability to access the content of the communication or information. In an encryption scheme, the communication or information, often referred to as plaintext, is encrypted using an encryption algorithm, generating what is typically referred to as ciphertext that can only be read if decrypted. Typically, an encryption scheme uses encryption keys to encrypt and decrypt the communication or information. An authorized party can easily decrypt a message or data with the proper key provided by the originator.

The encryption keys are generated in various manners to prevent a key from being guessed. In some instances, an encryption key may be generated in some manner so that the key is personalized to the user, such as from one or more user biometrics.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Since encryption keys may be generated from one or more biometrics, it may be desirable to facilitate improvements in the reliability and consistency in generating encryption keys from such biometrics. Various examples and implementations of the present disclosure facilitate key generation from one or more biometrics. According to at least one aspect of this disclosure, electronic devices may include a biometric information acquisition component configured to obtain biometric information from one or more individuals. A processing circuit may be coupled to the biometric information acquisition component and to a storage medium. The processing circuit may include logic to obtain a non-encoded bit string associated with the biometric information obtained by the biometric information acquisition component. The processing circuit may further include logic to modify the non-encoded bit string by decoding, and generate a cryptographic key based at least in part on the modified bit string.

Further aspects provide methods operational on electronic devices and/or electronic devices including means to perform such methods. One or more examples of such methods may include obtaining a first non-encoded bit string associated with biometric information from a first individual, and modifying the first non-encoded bit string by decoding the first bit string to obtain a first modified bit string. A cryptographic key may be generated based at least in part on the first modified bit string.

Still further aspects include processor-readable storage mediums storing programming executable by a processing circuit. According to one or more examples, such programming may be adapted to cause the processing circuit to obtain a first non-encoded bit string associated with at least one form of biometric information from a first individual, and modify the first non-encoded bit string by decoding the first bit string to obtain a first modified bit string. The programming may be further adapted to cause the processing circuit to generate a cryptographic key based at least in part on the first modified bit string.

Other aspects, features, and embodiments associated with the present disclosure will become apparent to those of ordinary skill in the art upon reviewing the following description in conjunction with the accompanying figures.

DRAWINGS

DETAILED DESCRIPTION

The description set forth below in connection with the appended drawings is intended as a description of various configurations and is not intended to represent the only configurations in which the concepts and features described herein may be practiced. The following description includes specific details for the purpose of providing a thorough understanding of various concepts. However, it will be apparent to those skilled in the art that these concepts may be practiced without these specific details. In some instances, well known circuits, structures, techniques and components are shown in block diagram form to avoid obscuring the described concepts and features.

Figure 1:
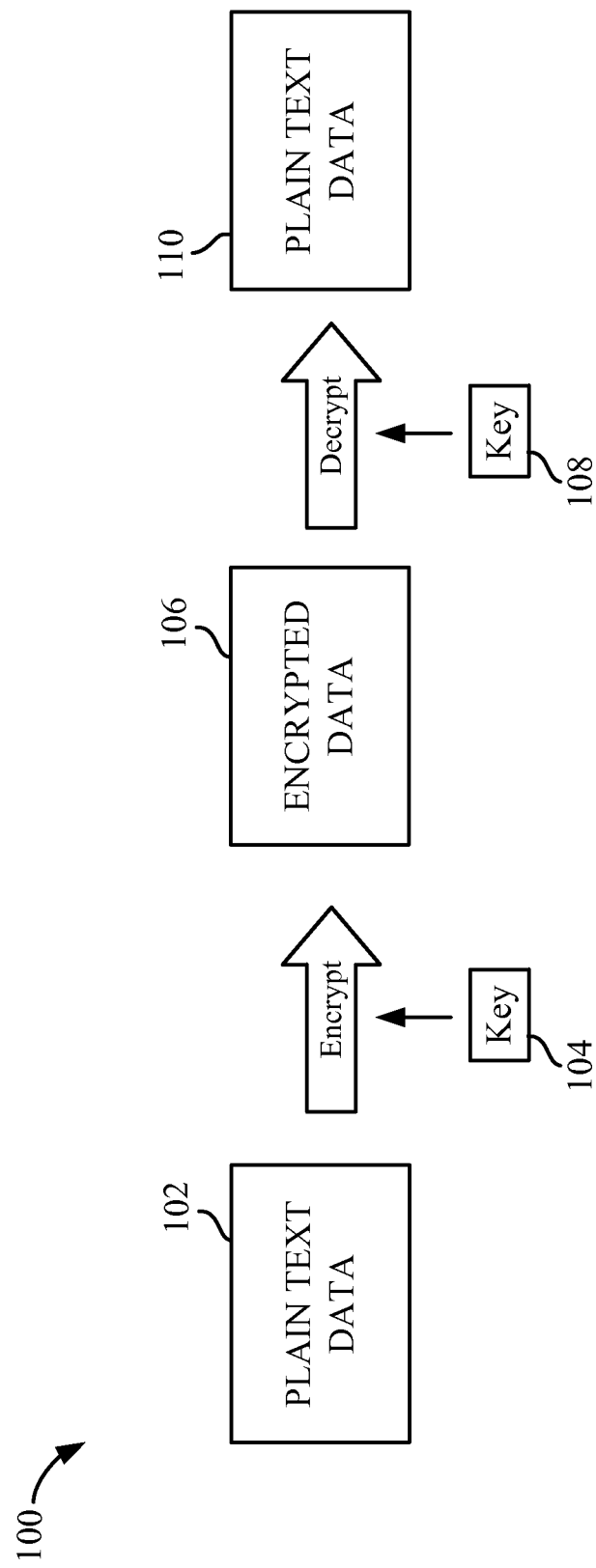
FIG. 1 illustrates a block diagram of a cryptographic environment in which one or more aspects of the present disclosure may find application.

Various embodiments of the present disclosure provide devices configured to generate and employ biometric-based cryptographic keys. FIG. 1 illustrates a block diagram of a cryptographic environment in which one or more aspects of the present disclosure may find application. The cryptographic system 100 is adapted to encrypt and decrypt a portion of data illustrated as plain text data 102. Initially, the plain text data 102 can be encrypted using a first cryptographic key 104 to obtain encrypted data 106. The encrypted data 106 can be conveyed to another user, device, component, etc., where a second key 108 can be used to decrypt the encrypted data 106 to obtain the original plain text data 110. According to various implementations, the first key 104 and the second key 108 may be a shared secret key, where the two keys are the same. In other implementations, the first key 104 and the second key 108 may be a private and public key pair.

In some instances, a key may be generated based on one or more biometrics associated with an individual. At times, a component configured to obtain biometric information from an individual may not obtain exactly the same digitized data each time biometric information is obtained from the individual. For example, a biometric information acquisition component may provide a bit string representing an individual's biometric. However, the bit string obtained from the biometric information acquisition component may have some minor variations each time biometric information is acquired for the same individual. When the biometric is used to generate cryptographic keys, such variations may result in different keys from two different biometric acquisitions from the same individual.

According to at least one aspect of the disclosure, electronic devices are adapted to facilitate key generations using one or more biometrics associated with an individual, where keys generated from two different biometric acquisitions from the same individual can be the same. That is, electronic devices of the present disclosure can reduce or even eliminate variations between different biometric acquisitions from the same individual. Such features can result in keys being reproducible from separate biometric acquisitions.

Cryptographic keys derived from biometric information can exhibit properties that may differ in one or more aspects from randomly generated cryptographic keys. For instance, a key generated from one or more biometrics cannot be changed, since biometrics for a specific organism are typically immutable. Additionally, a key generated from one or more biometrics cannot be forgotten, since it can simply be generated again from the same biometrics for the original organism. Further, the one or more biometrics are obtained from an individual who is, or has been, physically present. Different and/or additional features may be obtained from keys derived from biometric information. As a result, such biometrically derived keys may be suitable to some of the same and differing cryptographic applications compared to randomly derived keys.

Figure 2:
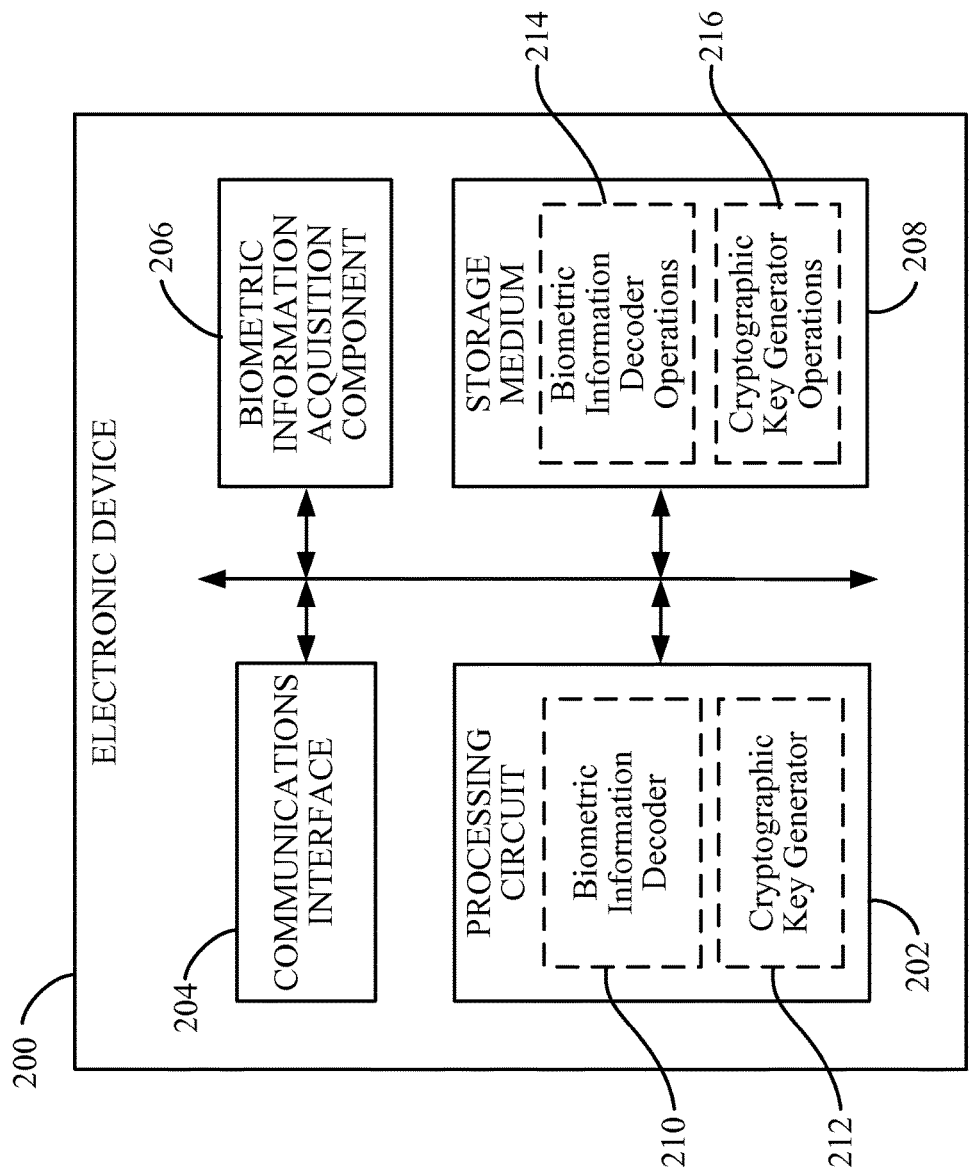
FIG. 2 is a block diagram illustrating select components of an electronic device according to at least one example of the disclosure.

Turning to FIG. 2, a block diagram is shown illustrating select components of an electronic device 200 according to at least one example of the present disclosure. The electronic device 200 includes a processing circuit 202 coupled to or placed in electrical communication with a communications interface 204, a biometric acquisition component 206, and a storage medium 208.

The processing circuit 202 is arranged to obtain, process and/or send data, control data access and storage, issue commands, and control other desired operations. The processing circuit 202 may include circuitry adapted to implement desired programming provided by appropriate media, and/or circuitry adapted to perform one or more functions described in this disclosure. For example, the processing circuit 202 may be implemented as one or more processors, one or more controllers, and/or other structure configured to execute executable programming and/or execute specific functions. Examples of the processing circuit 202 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 202 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 202 are for illustration and other suitable configurations within the scope of the present disclosure are also contemplated.

The processing circuit 202 may include circuitry adapted for processing, including the execution of programming, which may be stored on the storage medium 208. As used herein, the term "programming" shall be construed broadly to include without limitation instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

In some instances, the processing circuit 202 may include a biometric information decoder 210 and a cryptographic key generator 212. The biometric information decoder 210 may include circuitry and/or programming (e.g., programming stored on the storage medium 208) adapted to obtain a modified bit string by decoding a bit string associated with acquired biometric information, as if the acquired biometric information had been encoded. In some examples, the biometric information decoder 210 may be configured as a forward error correction decoder, such as a Viterbi decoder or a turbo decoder used in digital wireless communications.

The cryptographic key generator 212 may include circuitry and/or programming (e.g., programming stored on the storage medium 208) adapted to generate one or more cryptographic keys or key pairs employing the modified bit string as an input.

As used herein, reference to circuitry and/or programming may be generally referred to as logic (e.g., logic gates and/or data structure logic).

The communications interface 204 is configured as an interface for wireless and/or wired communications mediums. For example, the communications interface 204 may be configured to communicate information bi-directionally with respect to other communications devices in a network. The communications interface 204 may be coupled with an antenna (not shown) for wireless communications with wireless communications networks, and/or may include as a network interface card (NIC), a serial or parallel connection, a Universal Serial Bus (USB) interface, a Firewire interface, a Thunderbolt interface, or any other suitable arrangement for communicating with respect to public and/or private networks, as well as some combination thereof.

The biometric information acquisition component 206 may represent one or more components configured to obtain one or more biometrics from an individual. By way of example and not limitation, the biometric information acquisition component 206 may include one or more components from the group of components including a deoxyribonucleic acid (DNA) microarray, a fingerprint sensor, and an eye scanner.

Generally speaking, a DNA microarray is a collection of microscopic DNA spots attached to a solid surface and configured to measure the expression levels of large numbers of genes simultaneously or to genotype multiple regions of a genome. Each DNA spot contains a specific DNA sequence, commonly referred to as probes, used to hybridize a cDNA or cRNA sample (often referred to as a target) under high-stringency conditions. Probe hybridization is usually detected to determine relative abundance of nucleic acid sequences in the target. According to various embodiments of the present disclosure, a DNA microarray may be configured as a single nucleotide polymorphism (SNP) array. A SNP array is a type of DNA microarray configured to detect polymorphisms. Such a SNP array may generally include an array with immobilized allele-specific oligonucleotide (ASO) probes, fragmented nucleic acid sequences of target labeled with fluorescent dyes, and a detection system that records and interprets the hybridization signal. One example of a SNP array that may be employed according to the present disclosure can include a Genome-Wide Human SNP Array 5.0 or 6.0 GeneChip by Affymetrix of Santa Clara, Calif. The detection system of a DNA microarray, such as a SNP array, can obtain digitized results from the array, which digitized value can be used in one or more aspects of the present disclosure described below.

A fingerprint sensor is generally configured to capture a digital image of a fingerprint pattern. The captured image is often referred to as a live scan, which may be acquired using optical imaging, ultrasonic sensors, or capacitance sensors, according to one or more examples. The captured image is typically digitized, and the digitized value can be used in one or more aspects of the present disclosure described below.

An eye scanner may include a retinal scanner and/or an iris scanner. Generally speaking, a retinal scanner can cast a beam of light, such as low-energy infrared light, into an individual's eye as they look through an eyepiece. This beam of light traces a standardized path on the retina. Retinal blood vessels absorb light more readily than the surrounding tissue, such that the amount of reflection varies during the scan. The pattern of variations can be digitized and the digitized value can be used in one or more aspects of the present disclosure described below.

Iris recognition can employ video camera technology with subtle near infrared illumination to acquire images of the detail-rich, intricate structures of the iris which are visible externally. Digital templates may be obtained, and the digitized data may be used in one or more aspects of the present disclosure described below.

Although the foregoing examples are included for the biometric information acquisition component 206, it should be apparent that additional, other, and different components may also be employed to obtain biometric information from an individual.

Referring still to FIG. 2, the storage medium 208 may represent one or more processor-readable devices for storing programming, such as processor executable code or instructions (e.g., software, firmware), electronic data, databases, and/or other digital information. The storage medium 208 may also be used for storing data that is manipulated by the processing circuit 202 when executing programming The storage medium 208 may be any available media that can be accessed by a general purpose or special purpose processor, including portable or fixed storage devices, optical storage devices, and various other mediums capable of storing, containing and/or carrying programming By way of example and not limitation, the storage medium 208 may include a processor-readable storage medium such as a magnetic storage device (e.g., hard disk, floppy disk, magnetic strip), an optical storage medium (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and/or other mediums for storing programming, as well as any combination thereof.

The storage medium 208 may be coupled to the processing circuit 202 such that the processing circuit 202 can read information from, and write information to, the storage medium 208. That is, the storage medium 208 can be coupled to the processing circuit 202 so that the storage medium 208 is at least accessible by the processing circuit 202, including examples where the storage medium 208 is integral to the processing circuit 202 and/or examples where the storage medium 208 is separate from the processing circuit 202 (e.g., resident in the electronic device 200, external to the electronic device 200, distributed across multiple entities).

Programming stored by the storage medium 208, when executed by the processing circuit 202, can cause the processing circuit 202 to perform one or more of the various functions and/or process steps described herein. In at least some examples, the storage medium 208 may include biometric information decoder operations 214 and cryptographic key generator operations 216. The biometric information decoder operations 214 can be adapted to cause the processing circuit 202 to employ one or more forward error correction decoding operations to a bit string associated with biometric information acquired by the biometric information acquisition component 206. The cryptographic key generator operations 216 can be adapted to cause the processing circuit 202 to generate one or more cryptographic keys or key pairs employing results from the forward error correction decoding of the acquired biometric information.

According to one or more aspects of the present disclosure, the processing circuit 202 is adapted to perform (independently or in conjunction with the storage medium 208) any or all of the processes, functions, steps and/or routines for any or all of the electronic devices described herein (e.g., electronic device 200). As used herein, the term "adapted" in relation to the processing circuit 402 may refer to the processing circuit 202 being one or more of configured, employed, implemented, and/or programmed (in conjunction with the storage medium 208) to perform a particular process, function, step and/or routine according to various features described herein.

Figure 3:
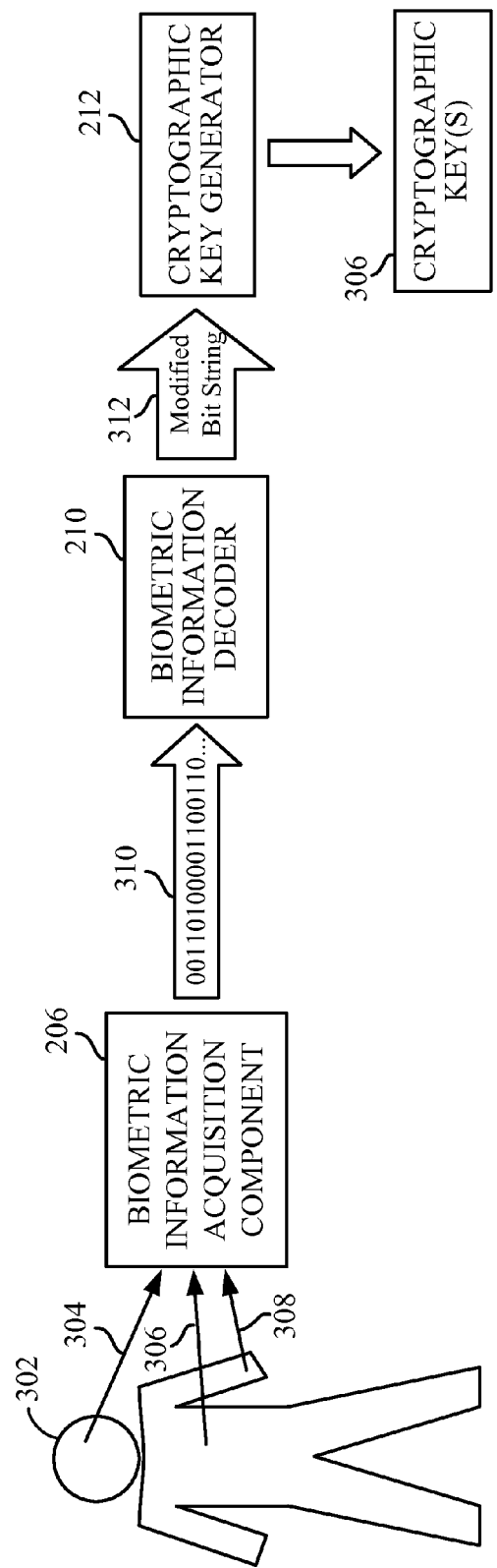
FIG. 3 is a block diagram illustrating one example of the present disclosure for generating one or more cryptographic keys from an individual's biometrics.

In operation, the electronic device 200 can generate cryptographic keys from one or more biometrics associated with an individual. FIG. 3 is a block diagram illustrating one example of the present disclosure for generating one or more cryptographic keys from an individual's biometrics. As shown, the biometric information acquisition component 206 can obtain one or more biometrics from an individual 302. As noted previously, such biometrics may include a retinal and/or iris scan 304, DNA information 306, and/or a fingerprint from the individual 308. In at least one example that will be used for describing the remaining diagram of FIG. 3, the biometric information can be DNA information in the form of single nucleotide polymorphisms (SNPs). In such examples, the biometric information acquisition component 206 can include a SNP array that tests for sets of biallelic SNPs.

The sets of biallelic SNPs that the SNP array tests for may be pre-selected amongst portions of DNA where variations are most frequent. The biometric information acquisition component 206 may assign one bit value for presence of a SNP or the other bit value if the SNP is not present. For example, a 1 may indicate that a SNP is present and a 0 may indicate that it is not, or vice versa. Because a SNP array can detect hundreds of thousands of SNPs, a relatively large bit string of 1s and 0s can be generated from the SNP array test. The actual length of the bit string can be predefined to ensure a significantly individualized result without being impractically large.

It can occur that the bit string obtained from a SNP array will vary each time a SNP array test is obtained from the same individual 302. To provide a similar bit string for use in generating cryptographic keys, the biometric information decoder 210 can employ decoding to the bit string. For instance, the bit string of 1s and 0s generated by the biometric information acquisition component 206 representing the biometric information obtained from the individual 302 is conveyed 310 to the biometric information decoder 210. Although the bit string is not encoded, the biometric information decoder 210 treats the bit string as if it were encoded. That is, the biometric information decoder 210 can treat the bit string as if it contains a number of 'k' symbols each made up of 'm' bits. The biometric information decoder 210 further treats the 'k' symbols as if they were forward error correction (FEC) encoded to produce encoded symbols each being (m+n) bits long, even though the bit string was never actually encoded. The total length 'L' of the resulting bit string can be treated as L=k*(m+n). Employing the pretense that the bit string represents encoded symbols 'k', the biometric information decoder 210 employs a forward error correction (FEC) decoding procedure to the bit string to obtain the assumed original 'k' symbols. By way of example, the biometric information decoder 210 may employ a Viterbi or turbo decoding process.

The bit string resulting from the biometric information decoder 210 may be referred to herein as a modified bit string. That is, since the original bit string representing the biometric information was not previously encoded, the bit string resulting from the biometric information decoder 210 is more of a modification to the original bit string than a decoded bit string. Further, the described biometric information decoder 210 can provide a modified bit string that is the same for each time the SNP array test is obtained from the same individual 302. That is, although the bit string from the SNP array test may vary each time data is obtained from the same individual 302, the biometric information decoder 210 can generate the same modified bit string each time by treating the bit string as if it were a plurality of 'k' symbols and reliably recovering the same k*m bits from the different SNP array tests.

Referring still to FIG. 3, the modified bit string is then conveyed 312 to the cryptographic key generator 212. The cryptographic key generator 212 can employ the modified bit string to generate one or more cryptographic keys. For example, the cryptographic key generator 212 may employ the modified bit string 'M' together with a shared domain secret 'D' to calculate a cryptographic key as SHA-256(M+D), where '+' in this example denotes concatenation. The modified bit string is a shared secret with very specific sharing properties in the physical world. The shared domain secret may be a conventional secret managed and shared by conventional techniques.

In some examples, it may be desirable to further modify the modified bit string. In other words, the modified bit string may represent sensitive data that defines one or more biometric characteristics of the individual 302. In some embodiments, the cryptographic key generator 212 may initially generate a hashed value from the modified bit string by passing the modified bit string through a cryptographic hash function, such as SHA-256 (e.g., $K_0$=SHA256(M)) or other similar hash function. Such a cryptographic hash function can yield a fixed length value '$k_0$', from which it is cryptographically difficult to determine any biometric information. In this example, the fixed length value '$K_0$' can be used to calculate a cryptographic key as SHA-256($K_0$+D), where the '+' again denotes concatenation.

Figure 4:
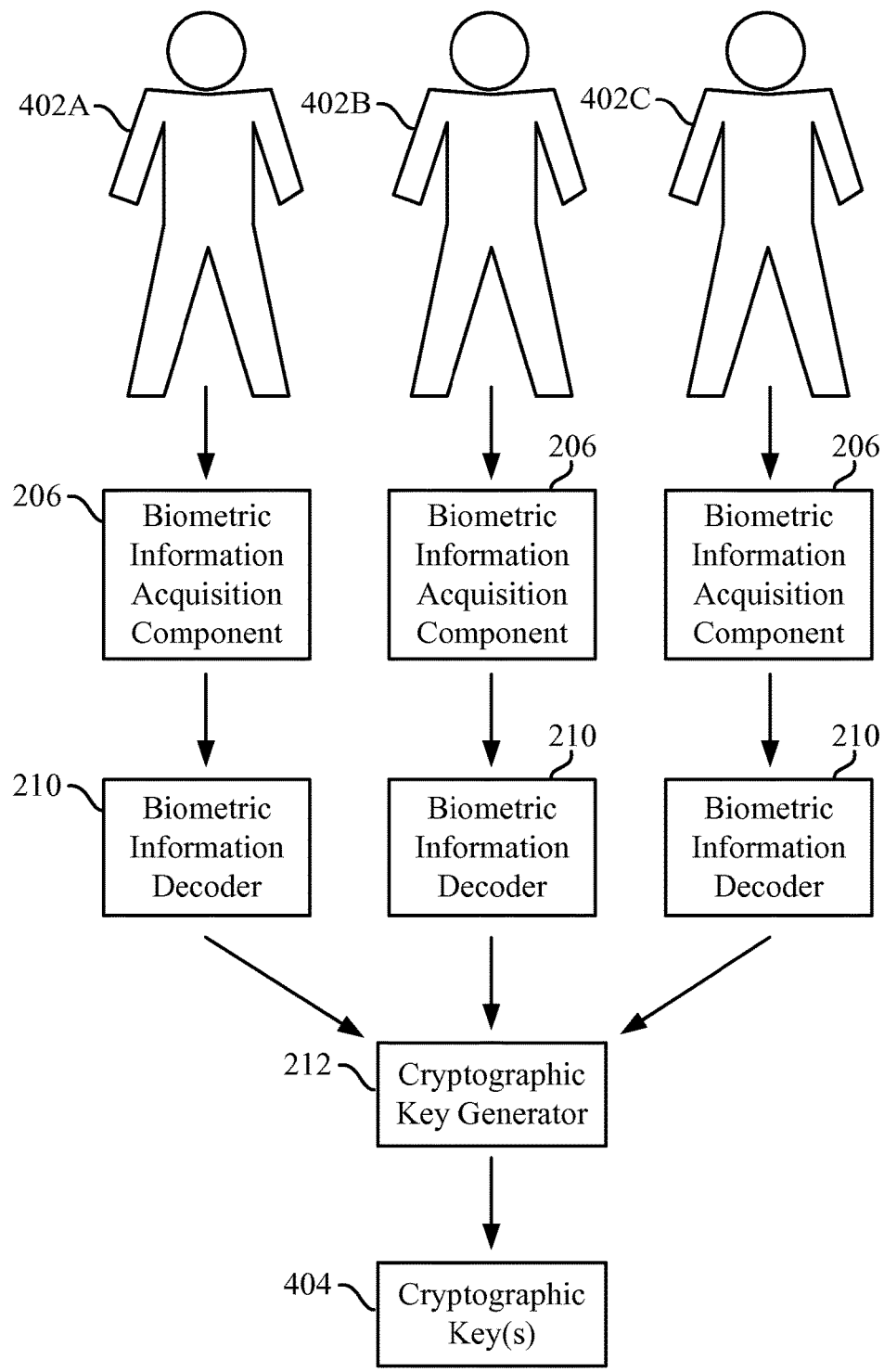
FIG. 4 is a block diagram illustrating at least one example of the present disclosure for generating one or more cryptographic keys from multiple individuals' biometrics.

The above scheme can be further extended to support keys requiring the presence of biometrics from multiple individuals 302. FIG. 4 is a block diagram illustrating at least one example of the present disclosure for generating one or more cryptographic keys from multiple individuals' biometrics. As shown, a biometric information acquisition component 206 may obtain biometric information from each of a plurality of individuals represented by first individual 402A, second individual 402B, and third individual 402C. Although three individuals 402A, 402B, 402C are depicted in FIG. 4, it should be understood that the number of individuals may vary anywhere from 2 or more. In some examples, the same biometric information acquisition component 206 may be employed to obtain the biometric information from each individual 402A, 402B, 402C. In other examples, different biometric information acquisition components 206 may be employed to obtain the biometric information from one or more different individuals 402A, 402B, 402C. The biometric information acquisition component 206 may obtain similar biometrics from each individual 402A, 402B, 402C, as well as additional or even different biometrics from different individuals 402A, 402B, 402C according to different examples.

The biometric information acquisition component(s) 206 can convey a bit string associated with the biometric information for each individual to a biometric information decoder 210. As noted above, the biometric information decoder 210 treats each bit string as if it were encoded to produce encoded symbols 'k' each being (m+n) bits long, even though the bit string was never actually encoded. The biometric information decoder 210 accordingly employs a forward error correction (FEC) decoding procedure to the bit string to obtain the assumed original 'k' symbols in the form of a modified bit string. In various examples, the same biometric decoder 210 may be employed to apply the decoding to each bit string from the biometric information acquisition component(s) 206, or different biometric decoders 210 may be employed to apply the decoding to each bit string from one or more biometric information acquisition components 206.

The modified bit strings generated from the one or more biometric information decoders 210 are each provided to the cryptographic key generator 212 for generating one or more cryptographic keys 404. For example, the modified bit string 'M' associated with each individual, or a hashed value from each modified bit string '$K_0$' can be employed as an input to generate one or more cryptographic keys 404. In at least one example for the depicted case with three different individuals, the cryptographic key generator 212 may employ the modified bit string '$M_1$', '$M_2$', and '$M_3$' (or a hashed value for each modified bit string '$K_0[1]$', '$K_0[2]$', and '$K_0[3]$') together with a shared domain secret 'D' to calculate a cryptographic key as SHA-256($M_1$+$M_2$+$M_3$+D) (or SHA-256($K_0[1]$+$K_0[2]$+'$K_0[3]$+D) when hashed values are employed), where '+' again denotes concatenation.

The example in FIG. 4 could alternatively be used to describe an implementation in which two or more different biometrics are employed from the same individual. For instance, each of the individuals 402A, 402B, 402C depicted in FIG. 4 may instead represent three different biometrics obtained from the same individual 402, and used to generate a cryptographic key. It will be apparent to those of skill in the art that various alternative combinations of biometrics and individuals may be employed to generate cryptographic keys in accordance with the principles associated with the examples described above.

Figure 5:
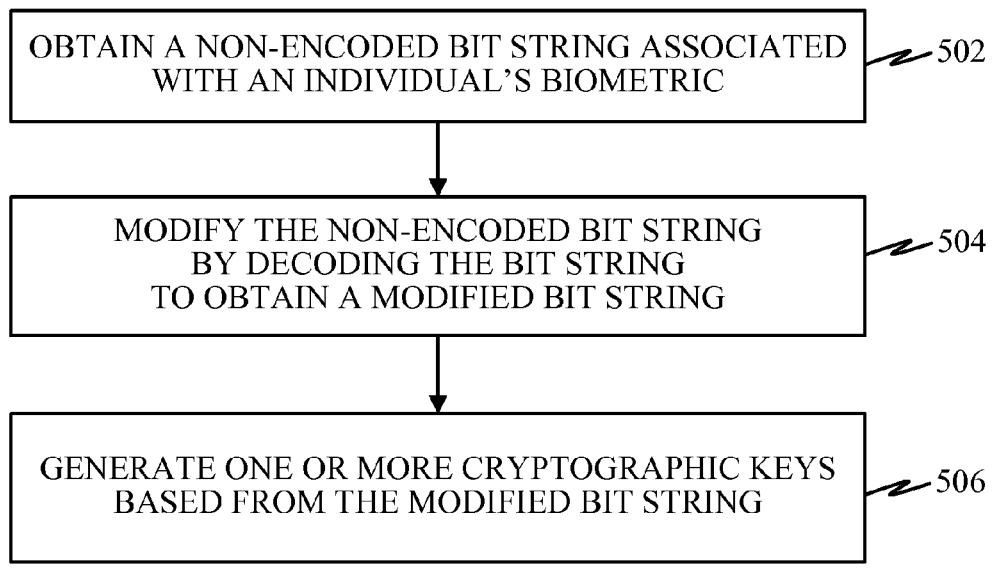
FIG. 5 is a flow diagram illustrating a method operational on an electronic device according to at least one example.

Referring now to FIG. 5, a flow diagram is shown illustrating at least one example of a method operational on an electronic device, such as the electronic device 200. Referring to FIGS. 2 and 5, an electronic device 200 can obtain a bit string associated with biometric information from an individual at 502. For example, the biometric information acquisition component 206 may provide a non-encoded bit string to the processing circuit 202. That is, the biometric information acquisition component 206 may obtain one or more forms of biometric information from one or more individuals, and may provide non-encoded bit strings associated with each obtained form of biometric information to the processing circuit 202 (e.g., the biometric information decoder 210).

At 504, the electronic device 200 may modify the non-encoded bit string by decoding the bit string to obtain a modified bit string. For example, the processing circuit 202 may include logic (e.g., the biometric information decoder 210 and/or the biometric information decoder operations 214) configured to employ a decoding operation on the non-encoded bit string. In some implementations, the decoding operation may include a forward error correction (FEC) decoding operation, such as Viterbi or Turbo decoding. In implementations where multiple bit strings are obtained, each bit string may be separately decoded.

At 506, one or more cryptographic keys may be generated based from the modified bit string. For example, the processing circuit 202 may include logic (e.g., the cryptographic key generator and/or the cryptographic key generator operations) configured to employ the modified bit string to calculate one or more cryptographic keys. In some implementations, the processing circuit 202 may include logic (e.g., the cryptographic key generator and/or the cryptographic key generator operations) to employ the modified bit string as an input for calculating a cryptographic key. In other implementations, the processing circuit 202 may include logic (e.g., the cryptographic key generator and/or the cryptographic key generator operations) configured to employ a cryptographic hash function to the modified bit string to obtain a hashed value, and then to employ the hashed value as an input for calculating a cryptographic key. In examples where biometric information is obtained from multiple individuals and/or where multiple forms of biometric information are obtained from an individual, the processing circuit 202 may include logic (e.g., the cryptographic key generator and/or the cryptographic key generator operations) configured to generate a cryptographic key based at least in part on each of the modified bit strings associated with each set of biometric information.

While the above discussed aspects, arrangements, and embodiments are discussed with specific details and particularity, one or more of the components, steps, features and/or functions illustrated in FIGS. 1, 2, 3, 4, and/or 5 may be rearranged and/or combined into a single component, step, feature or function or embodied in several components, steps, or functions. Additional elements, components, steps, and/or functions may also be added or not utilized without departing from the present disclosure. The apparatus, devices and/or components illustrated in FIGS. 2, 3, and/or 4 may be configured to perform or employ one or more of the methods, features, parameters, and/or steps described in FIGS. 1, 3, 4, and/or 5. The novel algorithms described herein may also be efficiently implemented in software and/or embedded in hardware.

While features of the present disclosure may have been discussed relative to certain embodiments and figures, all embodiments of the present disclosure can include one or more of the advantageous features discussed herein. In other words, while one or more embodiments may have been discussed as having certain advantageous features, one or more of such features may also be used in accordance with any of the various embodiments discussed herein. In similar fashion, while exemplary embodiments may have been discussed herein as device, system, or method embodiments, it should be understood that such exemplary embodiments can be implemented in various devices, systems, and methods.

Also, it is noted that at least some implementations have been described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function. The various methods described herein may be partially or fully implemented by programming (e.g., instructions and/or data) that may be stored in a processor-readable storage medium, and executed by one or more processors, machines and/or devices.

Those of skill in the art would further appreciate that the various illustrative logical blocks, modules, circuits, and algorithm steps described in connection with the embodiments disclosed herein may be implemented as hardware, software, firmware, middleware, microcode, or any combination thereof. To clearly illustrate this interchangeability, various illustrative components, blocks, modules, circuits, and steps have been described above generally in terms of their functionality. Whether such functionality is implemented as hardware or software depends upon the particular application and design constraints imposed on the overall system.

The various features associate with the examples described herein and shown in the accompanying drawings can be implemented in different examples and implementations without departing from the scope of the present disclosure. Therefore, although certain specific constructions and arrangements have been described and shown in the accompanying drawings, such embodiments are merely illustrative and not restrictive of the scope of the disclosure, since various other additions and modifications to, and deletions from, the described embodiments will be apparent to one of ordinary skill in the art. Thus, the scope of the disclosure is only determined by the literal language, and legal equivalents, of the claims which follow.

What is claimed is:

1. An electronic device, comprising:
  a biometric information acquisition component configured to obtain biometric information from an individual;
  a storage medium; and
  a processing circuit coupled to the biometric information acquisition component and the storage medium, the processing circuit adapted to:
  obtain a non-encoded bit string associated with a first acquisition of biometric information from an individual by the biometric information acquisition component;

modify the non-encoded bit string by decoding the non-encoded bit string treating the non-encoded bit string as if it were a plurality of encoded symbols each formed by a plurality of bits; and generate a first cryptographic key based at least in part on the modified bit string;

wherein the first cryptographic key is similar to a second cryptographic key based at least in part on another modified bit string, the other modified bit string obtained by decoding another non-encoded bit string associated with a second acquisition of biometric information from the individual; and wherein the first cryptographic key is used to encrypt and decrypt plain text data.

2. The electronic device of claim 1, wherein the biometric information acquisition component comprises at least one biometric information acquisition component selected from a group of components comprising a DNA microarray, a fingerprint sensor, and an eye scanner.

3. The electronic device of claim 1, wherein the biometric information acquisition component comprises a DNA microarray configured as a single nucleotide polymorphism (SNP) array.

4. The electronic device of claim 1, wherein the processing circuit adapted to generate the first cryptographic key based on the modified bit string comprises the processing circuit adapted to:
employ the modified bit string as an input for calculating the first cryptographic key.

5. The electronic device of claim 1, wherein the processing circuit adapted to generate the first cryptographic key based on the modified bit string comprises the processing circuit adapted to:
employ a cryptographic hash function to the modified bit string to obtain a hashed value; and
employ the hashed value as an input for calculating the first cryptographic key.

6. The electronic device of claim 1, wherein:
the biometric information acquisition component is configured to obtain biometric information from a plurality of individuals; and
the processing circuit is adapted to:
obtain from the biometric information acquisition component a non-encoded bit string associated with a first acquisition of biometric information from each individual;
modify each non-encoded bit string by decoding each non-encoded bit string treating each non-encoded bit string as if it were a plurality of encoded symbols each formed by a plurality of bits; and
generate the first cryptographic key based at least in part on each of the modified bit strings;
wherein the first cryptographic key is similar to a second cryptographic key based at least in part on a plurality of other modified bit strings, each obtained by decoding another non-encoded bit string associated with a second acquisition of biometric information from each individual.

7. The electronic device of claim 1, wherein:
the biometric information acquisition component is configured to obtain biometric information for more than one biometric from the individual; and
the processing circuit is adapted to:
obtain a non-encoded bit string associated with a first acquisition of biometric information for each biometric from the individual;
modify each non-encoded bit string by decoding each non-encoded bit string treating each non-encoded bit string as if it were a plurality of encoded symbols each formed by a plurality of bits; and
generate the first cryptographic key based at least in part on each of the modified bit strings;
wherein the first cryptographic key is similar to a second cryptographic key based at least in part on a plurality of other modified bit strings, each of the plurality of other modified bit strings obtained by respectively decoding another non-encoded bit string associated with a second acquisition of biometric information for each biometric.

8. A method operational on an electronic device, comprising:
obtaining a first non-encoded bit string associated with a first acquisition of biometric information from a first individual;
modifying the first non-encoded bit string by decoding the first bit string to obtain a first modified bit string, wherein decoding the first bit string comprises employing a pretense that the first bit string represents encoded symbols each formed by a number of bits; and
generating a first cryptographic key based at least in part on the first modified bit string,
wherein the first cryptographic key is similar to a second cryptographic key based at least in part on another modified bit string, the other modified bit string obtained by decoding another non-encoded bit string associated with a second acquisition of biometric information from the first individual; and
wherein the first cryptographic key is used to encrypt and decrypt plain text data.

9. The method of claim 8, wherein obtaining the first non-encoded bit string associated with the first acquisition of biometric information from the first individual comprises:
obtaining the first non-encoded bit string associated with at least one form of biometric information selected from a group of biometric information forms comprising DNA information, fingerprint information, and eye information.

10. The method of claim 8, wherein the biometric information comprises single nucleotide polymorphism (SNP) information from the first individual.

11. The method of claim 8, wherein generating the first cryptographic key based at least in part on the first modified bit string comprises:
employing the first modified bit string as an input for calculating the first cryptographic key.

12. The method of claim 8, wherein generating the first cryptographic key based at least in part on the first modified bit string comprises:
employing a cryptographic hash function to the first modified bit string to obtain a hashed value; and
employing the hashed value as an input for calculating the first cryptographic key.

13. The method of claim 8, further comprising:
obtaining a second non-encoded bit string associated with a first acquisition of biometric information from a second individual;
modifying the second non-encoded bit string by decoding the second bit string to obtain a second modified bit string, wherein decoding the second bit string comprises employing a pretense that the second bit string represents encoded symbols each formed by a number of bits; and generating the first cryptographic key based at least in part on the first modified bit string and the second modified bit string.

14. The method of claim 8, further comprising:
obtaining a second non-encoded bit string associated with a first acquisition of other biometric information from the first individual;
modifying the second non-encoded bit string by decoding the second bit string to obtain a second modified bit string, wherein decoding the second bit string comprises employing a pretense that the second bit string represents encoded symbols each formed by a number of bits; and
generating the first cryptographic key based at least in part on the first modified bit string and the second modified bit string.

15. An electronic device, comprising:
means for obtaining a first non-encoded bit string associated with a first acquisition of at least one form of biometric information from a first individual;
means for modifying the first non-encoded bit string by decoding the first bit string to obtain a first modified bit string, wherein decoding the first bit string comprises treating the first bit string as if it were a plurality of encoded symbols each formed by a plurality of bits; and
means for generating a first cryptographic key based at least in part on the first modified bit string, wherein the first cryptographic key is similar to a second cryptographic key that is based at least in part on another modified bit string, the other modified bit string obtained by decoding another non-encoded bit string associated with a second acquisition of biometric information from the first individual; and
wherein the first cryptographic key is used to encrypt and decrypt plain text data.

16. The electronic device of claim 15, wherein the biometric information includes at least one of DNA information, fingerprint information, and eye information.

17. The electronic device of claim 15, wherein the first modified bit string is employed as an input for calculating the cryptographic key.

18. The electronic device of claim 15, further comprising:
means for employing a cryptographic hash function to the first modified bit string to calculate a hashed value; and
means for employing the hashed value as an input to generate the first cryptographic key.

19. The electronic device of claim 15, further comprising:
means for obtaining a second non-encoded bit string associated with a first acquisition of at least one form of biometric information from a second individual;
means for modifying the second non-encoded bit string by decoding the second bit string to obtain a second modified bit string, wherein decoding the second bit string comprises treating the second bit string as if it were a plurality of encoded symbols each formed by a plurality of bits; and
means for generating the first cryptographic key based at least in part on the first and second modified bit strings.

20. The electronic device of claim 15, further comprising:
means for obtaining a second non-encoded bit string associated with a first acquisition of a second form of biometric information from the first individual;
means for modifying the second non-encoded bit string by decoding the second bit string to obtain a second modified bit string, wherein decoding the second bit string comprises treating the second bit string as if it were a plurality of encoded symbols each formed by a plurality of bits; and
means for generating the first cryptographic key based at least in part on the first and second modified bit strings.

21. A non-transitory processor-readable storage medium storing processor-executable programming for causing a processing circuit to:
obtain a first non-encoded bit string associated with at least one form of biometric information from a first individual;
modify the first non-encoded bit string by decoding the first bit string as if the first bit string represents encoded symbols each formed by a number of bits to obtain a first modified bit string; and
generate a first cryptographic key based at least in part on the first modified bit string, wherein the first cryptographic key is similar to a second cryptographic key based at least in part on another modified bit string, the other modified bit string obtained by decoding another non-encoded bit string associated with a second acquisition of biometric information from the first individual; and
wherein the first cryptographic key is used to encrypt and decrypt plain text data.

22. The non-transitory processor-readable storage medium of claim 21, wherein the biometric information includes at least one of DNA information, fingerprint information, and eye information.

23. The non-transitory processor-readable storage medium of claim 21, wherein the processor-executable programming for causing the processing circuit to generate the first cryptographic key based at least in part on the first modified bit string comprises processor-executable programming for causing a processing circuit to:
employ the first modified bit string as an input for calculating the first cryptographic key.

24. The non-transitory processor-readable storage medium of claim 21, wherein the processor-executable programming for causing the processing circuit to generate the first cryptographic key based at least in part on the first modified bit string comprises processor-executable programming for causing a processing circuit to:
employ a cryptographic hash function to the first modified bit string to calculate a hashed value; and
employ the hashed value as an input to generate the first cryptographic key.

25. The non-transitory processor-readable storage medium of claim 21, storing processor-executable programming for causing a processing circuit to:
obtain a second non-encoded bit string associated with a first acquisition of at least one form of biometric information from a second individual;
modify the second non-encoded bit string by decoding the second bit string as if the second bit string represents encoded symbols each formed by a number of bits to obtain a second modified bit string; and
generate the first cryptographic key based at least in part on the first and second modified bit strings.

26. The non-transitory processor-readable storage medium of claim 21, storing processor-executable programming for causing a processing circuit to:
obtain a second non-encoded bit string associated with a first acquisition of a second form of biometric information from the first individual;
modify the second non-encoded bit string by decoding the second bit string as if the second bit string represents encoded symbols each formed by a number of bits to obtain a second modified bit string; and
generate the first cryptographic key based at least in part on the first and second modified bit strings.

* * * * *